United States Patent [19]

Buckley

[11] 4,121,830

[45] Oct. 24, 1978

[54] BINGO COMPUTER APPARATUS AND METHOD

[75] Inventor: Dennis J. Buckley, Nashua, N.H.

[73] Assignee: Random Electronic Games Co., Merrimack, N.H.

[21] Appl. No.: 828,645

[22] Filed: Aug. 29, 1977

[51] Int. Cl.[2] ........................... A63F 9/00; G06F 7/00

[52] U.S. Cl. ............................... 273/138 A; 273/139; 364/717

[58] Field of Search .................... 273/1 E, 138 A, 237, 273/139; 328/59; 331/78; 340/323 R; 364/717

[56] References Cited

U.S. PATENT DOCUMENTS

| | | | |
|---|---|---|---|
| 3,653,026 | 3/1972 | Hurley | 273/139 X |
| 3,703,727 | 11/1972 | Knowlton | 364/717 |
| 3,706,941 | 12/1972 | Cohn | 331/78 |
| 3,811,038 | 5/1974 | Reddaway | 364/717 |
| 3,876,208 | 4/1975 | Wachtler et al. | 273/138 A |
| 4,047,008 | 9/1977 | Perkins | 364/717 |

*Primary Examiner*—Vance Y. Hum

*Attorney, Agent, or Firm*—Thomas N. Tarrant

[57] ABSTRACT

A bingo computer in which every number has a storage location in an addressable memory and a "pick" counter sequentially addresses the memory at a high rate of speed for locations picked and a much lower rate for locations not picked. A display counter shares the memory.

8 Claims, 2 Drawing Figures

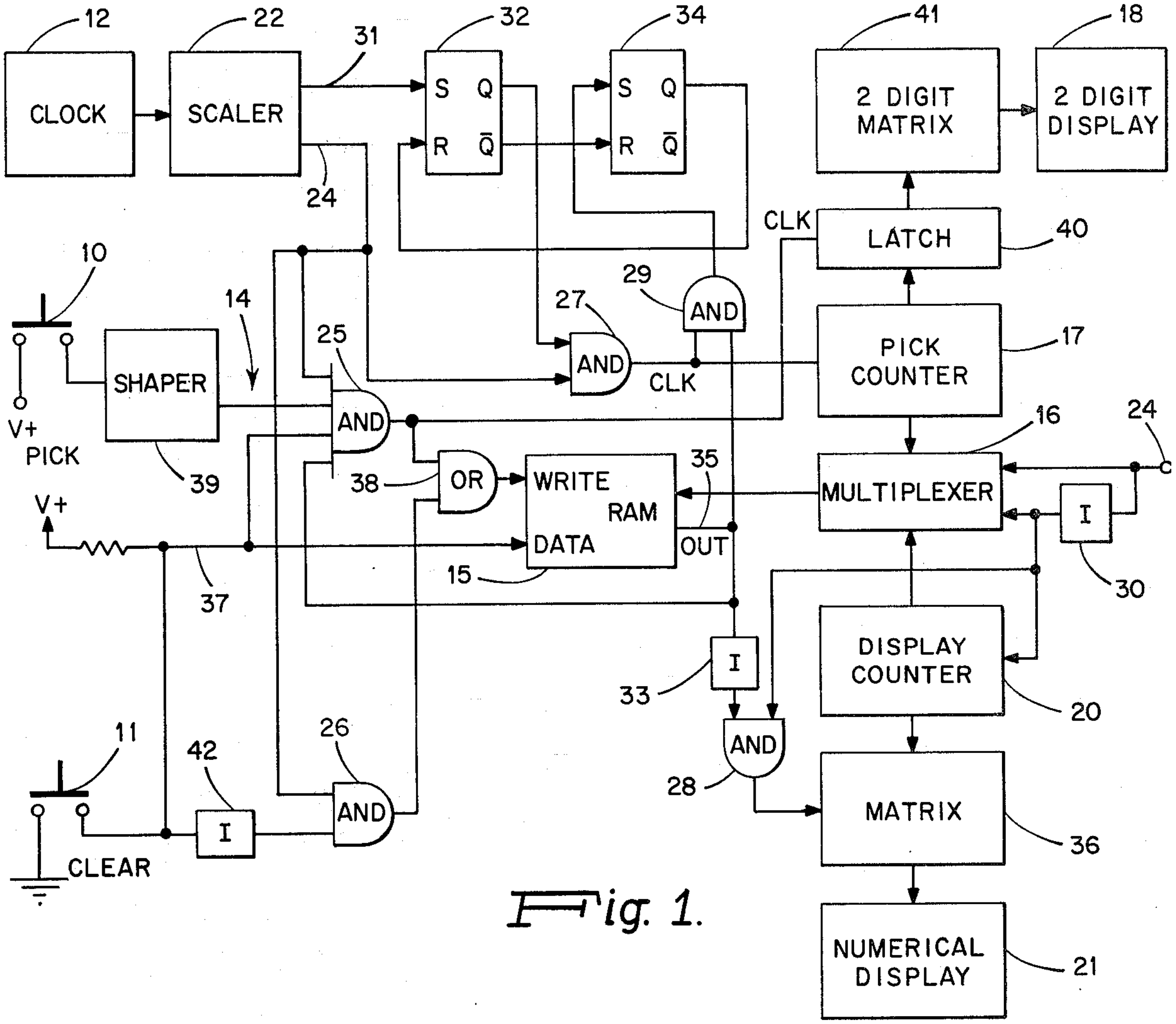
Fig. 1.
Fig. 2.
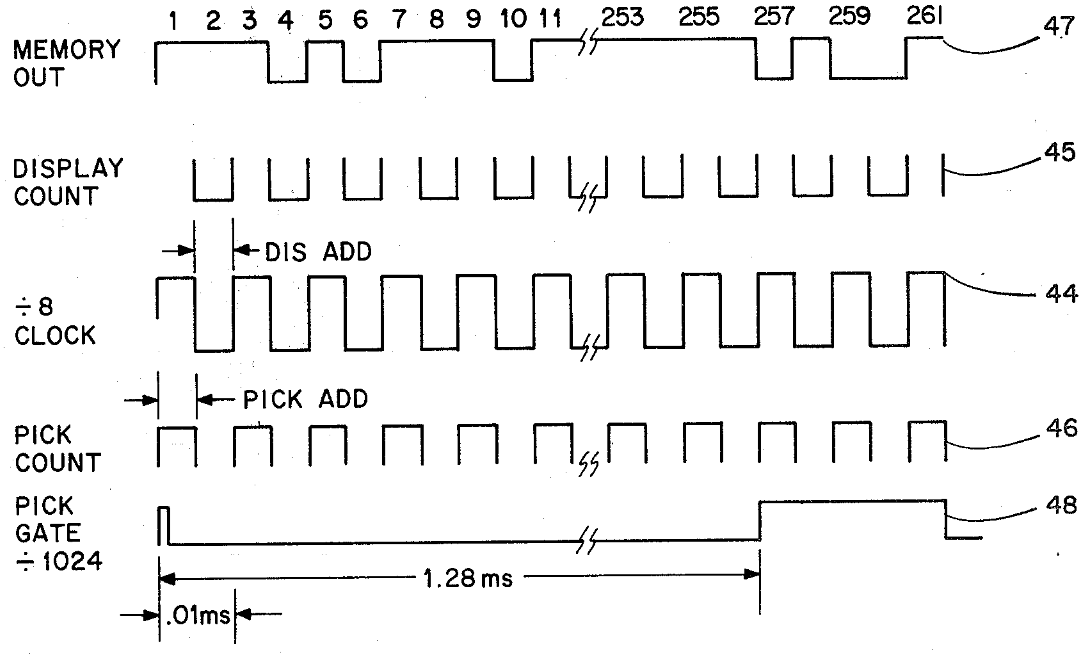

BINGO COMPUTER APPARATUS AND METHOD

BACKGROUND OF THE INVENTION

1. Field of the Invention:

The present invention relates to random selection systems and particularly to such systems employing data processing hardware for games such as bingo.

2. Description of the Prior Art:

There have been various attempts at adapting data processing hardware to random selection games such as bingo. U.S. Pat. No. 3,653,026 to Frederick Hurley in exemplary. A problem with most of these is they become less and less random as more of the possible selections become picked. This happens because the simplest organization calls for skipping to the first unpicked number when the random selection falls on a previously picked number. The result is that numbers immediately following previously picked numbers become preferentially weighted. The problem presented is how to remove the effect of previously picked numbers on the randomness of the system.

Still another difficulty exists. For games such as bingo, a display is desired showing all numbers that have been previously selected. If the display is activated from the same memory in which the new selections are being added, an operator could affect the randomness of his selections by relating his instance of selection to the visible sequence point in the cyclical activation of the display.

As a result of these problems, cumbersome mechanical apparatus is still prevalent in most bingo game usage.

SUMMARY OF THE INVENTION:

The present invention provides a bingo computer using a random access memory (RAM) which is time shared by an addressing display counter for display and an addressing selection counter for new selections (pick). This completely eliminates interaction between display and selection cycling of the memory. The selection counter cycles much slower than the display counter due to a relatively slow enable gate cycle. The enable gate passes only one clock pulse for each gate cycle as long as the addressed locations have not been picked, but the output of the memory holds the gate open when previously picked locations are addressed so that memory locations previously picked are skipped over at a relatively high rate.

Thus it is an object of the invention to provide a digital bingo computer and method in which previously selected numbers have no significant affect on the randomness of additional selections.

Further objects and features of the invention will become apparent upon reading the following description together with the drawing.

BRIEF DESCRIPTION OF THE DRAWING

FIG. 1 is a block diagram of a bingo computer according to the invention.

FIG. 2 is a graphical illustration depicting some of the timing relationships used in cycling a bingo computer according to the invention.

DESCRIPTION OF THE PREFERRED EMBODIMENT

The hear of the present bingo computer is a random access memory that has at least 75 addressable storage locations but requires only a one-bit word at each location. A block diagram of the system is depicted in FIG. 1 and shows two manual input switches, PICK 10 and CLEAR 11. Clock Generator 12 provides a timing base and Input Logic 14 is a logic network for applying clock pulses to Memory 15 at the desired instances of time.

The locations in Memory 15 are addressed through Multiplexer 16 by Pick Counter 17. Pick Counter 17 continuously cycles through a sequence of addresses, i.e. 75. When one of the addresses is "Picked", it is displayed on Last Number Picked display 18. Alternatively, the locations in Memory 15 are addressed through Multiplexer 16 by Display Counter 20. Display Counter 20 also continuously cycles through the same sequence of addresses as does Pick Counter 17. Display Counter 20 simultaneously addresses Numerical Display 21. An enable signal from Memory 15 causes any number previously picked to be illuminated when addressed.

Counters 17 and 20 are parallel output counters of a conventional type. Multiplexer 16 is a parallel-input, parallel-output multiplexer of conventional type and Memory 15 is a conventional random access memory using parallel input addressing.

The timing and logic layout of the system is of particular significance. Clock Generator 12 is an oscillator operating at a fairly high frequency, for example 800 kilohertz. Scaler 22 connected to Clock Generator 12 divides the 800 KHZ by 8 and by 1024 to provide two clock signals of 100 KHZ and 781.25 HZ respectively.

Divide by 8 Output 24 of Scaler 22 is connected to Input Logic 14 at AND Gates 25 and 26. Output 24 is also connected to AND Gate 27 which provides the Clock for Counter 17. Output 24 is further connected as a clock input to Multiplexer 16, AND Gate 28 and Inverter 30. Inverter 30 is in turn connected as a second clock input to Multiplexer 16 and as a clock input to Display Counter 20.

Divide by 1024 Output 31 of Scaler 22 is connected as the SET input of flip-flop 32. The Q output of flip-flop 32 is connected as a second input to AND Gate 27. The output of AND Gate 27 is connected to Pick Counter 17 as a clock input and also to AND Gate 29. The output of AND Gate 29 is connected to the SET input of flip-flop 34. The Q output of flip-flop 34 is connected to the RESET input of flip-flop 32. The Q output of flip-flop 32 is connected to the RESET input of flip-flop 34. The second input connection to AND Gate 29 is from Output 35 of Memory 15.

Output 34 is further connected as a second input to both AND Gate 25 and AND Gate 28. The input to AND Gate 28 is connected through Inverter 33. The output of AND Gate 28 is connected as an enable input to selection Matrix 36. Matrix 36 is connected between Display Counter 20 and Numerical Display 21 and is driven by Counter 20 to illuminate a selected number in Display 21 when enabled by Gate 28.

Two further inputs to Gate 25 are provided from Data Line 37 and Pulse Shaper 39. PICK Switch 10 is connected to the input of Pulse Shaper 39 which serves a timing and shaping function. This ensures that the PICK Pulse is long enough to pick a new number, but not long enough to pick more than one. Data Line 37 is held positive for writing and at a relatively lower voltage such as zero volts for erase. As depicted, CLEAR Switch 11 connected to Data Line 37, takes the line to ground (zero volts) when actuated.

PICK Switch 10 connects a positive voltage when actuated. AND Gate 25 provides an output when all inputs are positive. The output of AND Gate 25 is connected to OR Gate 38 and to the clock input of Latch 40.

Latch 40 connects the address output of PICK Counter 17 to Two Digit Matrix 41. Latch 40 is suitably made with Quad D integrated circuit latches. At each clock pulse received, Latch 40 registers the address at the output of Counter 17 and holds it until the next clock pulse is received. Two Digit Matrix 41 is connected to and drives Last Number Display 18.

Data Line 37 is also connected to Inverter 42 which in turn is connected as a second input to AND Gate 26. The Output of AND Gate 26 is connected as a second input to OR Gate 38. The output of OR Gate 38 is connected as the clock input of Memory 15.

The output of Multiplexer 16 is connected to the address input of Memory 15.

The present Bingo Computer will be better understood by description of its operation. Since timing plays a large factor in the operation, the timing chart of FIG. 2 is referred to in the following discussion of operation.

Basic clock wave 44 for the system is the divide by 8 output of Scaler 22. This clock is depicted by square wave 44 having an exemplary period of 0.01 milliseconds. During each positive half of clock wave 44, Multiplexer 16 connects the address from PICK Counter 17 to Memory 15. During each negative half of clock wave 44, Multiplexer 16 connects the address from Display Counter 20 to Memory 15.

While not necessarily so in practice, for purposes of this description positive transitions and positive wave form portions are assumed to be active or enabling unless otherwise specified. Accordingly, the negative half of wave 44 is inverted by Inverter 30 for the alternate input to Multiplexer 16.

Similarly, the output of Inverter 30 counts Display Counter 20 by inverting every negative transition of wave 44. Display Counter 20 thus counts with every cycle of Clock wave 44. In accordance with the exemplary frequencies stated this provides 100,000 counts per second. This rate is more than sufficient to make every picked number appear continuously illuminated in Display 21. The count pulses to Display Counter 20 are depicted in FIG. 2 by display count pulses 45. Pick count pulses 46 are merely the positive transitions of wave 44, but most of them never reach Pick Counter 17. AND Gate 27 passes Pick Count Pulses 46 only when the Q output of flip-flop 32 is positive. The Q output of flip-flop 32 goes positive with each positive transition of the Divide by 1024 Output 31. The Q output of flip-flop 32 goes negative everytime flip-flop 34 is set. Flip-flop 34 is set every time there is an output from AND Gate 27 and Output 35 of Memory 15 is high indicating an unpicked number.

The affect of all this is depicted in FIG. 2 with the additional waveform 47 for Memory 15 output 35 and waveform 48 for the Q output of flip-flop 32. Waveform 48 is also called the pick gate. FIG. 2 assumes that some previous picking has been performed, but no Pick or Clear occurs during the FIG. 2 sequence. The timing sequence of FIG. 2 is divided into 0.005 ms time slots numbered 1 through 11 and then taking up again at 253 to continue through 261. The discontinuity is only to save illustrating space.

At time slot 1 waves 44, 47 and 48 are all positive. This passes a single pick count to Counter 17 and simultaneously terminates the Pick Gate. The Pick Gate will remain blocking for another 127 periods of Clock Waveform 44. Thus irrespective of what else happens, Counter 17 cannot be counted again for 1.28 ms. The operation has been started with a pick count to Counter 17 at the same time Multiplexer 16 connects the address from Counter 17 to Memory 15. Since the addressed location in Memory 15 has not been picked (Wave 47) AND Gate 29 is enabled and flip-flop 34 is set terminating the Pick Gate. During time slot 2 Display Counter 20 is counted but since the addressed location has not been picked, matrix 36 is not enabled.

Time slot 3 and every odd time slot up through time slot 255 is multiplexed to Pick Counter 17 without any change in the count of Counter 17 due to the Pick Gate (wave 48).

At the beginning of time slot 4 Display Counter 20 is clocked to a new address depicted by Wave 47 as a picked address. Accordingly, the number represented by the addressed location in Memory 15 is displayed by Numerical Display 21. The negative output of Memory 15 inverted by Inverter 33 together with the negative clock wave inverted by Inverter 30, actuate AND Gate 28 enabling display Matrix 36. The same address applied by Display Counter 20 to Memory 15 addresses Matrix 36 to illuminate the correct display numerals. Time slots 6 and 10 in similar fashion provide illumination of addressed display numerals.

At time slot 257, divide by 1024 Output 31 goes positive again setting flip-flop 32 and reenabling Gate 27. A Pick Count is passed counting Pick Counter 17 to an address that has been previously picked (Wave 47). This causes output 35 of Memory 15 to go low blocking Gate 29 thus preventing flip-flop 32 from being reset.

At time slot 258 Display Counter 20 counts to an unpicked address giving no display. At time slot 259 Pick Counter 17 is clocked again but the new address has also been previously picked and again flip-flop 32 is not reset.

Time slot 260 provides a previously picked address in Display Counter 20 which accordingly is displayed and time slot 261 clocks Pick Counter 17 to an unpicked address allowing flip-flop 32 to reset terminating Pick Gate.

The overall effect is that the display counter operates at a 100 khz displaying only those numbers previously picked. At the same time the pick counter counts unpicked numbers at a steady 781.25 hz. Previously picked numbers are counted through fast whenever they show up in an irregular manner between the unpicked numbers. Since the sequencing of the unpicked numbers is at a consistent rate unaffected by the appearance of picked numbers, selection can be effectively random.

Operation of the remainder of the computer and in fact the component description previously given are not critical to the invention and accordingly are herein simplified.

As depicted, picking new numbers is initiated by simple single pole single throw momentary switch 10. Switch 10 drives Pulse Shaper 39 which provides a clean pulse having a length suitably that of the period of the Divide by 1024 Clock. The length has to be long enough to encompass up the next Pick Count of an unpicked number. AND Gate 25 will pass a WRITE pulse only on the coincidence of: 1. The positive half of the divide by 8 clock, 2. a positive output from Memory 15, 3. a positive pulse from Pulse Shaper 39, and 4. a positive voltage on Data Line 37. Thus after Switch 10 has been actuated, the next unpicked number addressed by Counter 17 will become "Picked". Depending on the design of Pulse Shaper 39, there may actually be a slight delay following operation of Switch 10 allowing one or more additional unpicked numbers to be addressed before one becomes "Picked".

The output of AND Gate 25 in addition to recording the PICK in Memory 15, actuates Latch 40. Latch 40 has the function of placing at its output an address received at its input only after incidence of a clock pulse. The output address then remains constant despite in input address until another clock pulse is encountered. Since AND Gate 25 only provides Clock pulses on a new PICK, the output address of Latch 40 always addresses Matrix 41 with the last number picked.

Clear Switch 11 takes Data Line 37 to zero voltage. This provides an erase signal on the Data input of Memory 15 and simultaneously blocks AND Gate 25. Through Inverter 42, this also provides an enable voltage to AND Gate 26. Now during every positive half of the divide by 8 clock, AND Gate 25 and OR Gate 38 clock Memory 15 with an erase signal present. A pulse shaper (not shown) is desirably interposed following switch 11 as a buffer to ensure a clean clear pulse of sufficient length.

In use, Bingo Computers according to the invention are connected to additional displays with appropriate buffers and amplifiers as required.

While the invention has been described with respect to a specific embodiment, there are many variations contemplated within the scope of the invention. Within the limitation that the pick counter must cycle fast enough to prevent human weighting of selections, the clock frequencies can be varied. While the described embodiment only provides for the numerical display to be active fifty percent of the time, a holding circuit is readily added to gate 28 for maintaining display power during the positive half of the divide by eight clock. Thus it is intended to cover not only the described embodiment, but also those variations falling within the scope of the appended claims.

I claim:

1. A random number selector for games comprising:

(a) a memory having an addressable storage location for each number in a game;

(b) means to sequentially address each said storage location;

(c) random selection means to selectively record a pick at a storage location when it is addressed and including means for picking a number;

(d) first clock means operating at a first cyclical rate for clocking said means to sequentially address through each said storage location;

(e) gate means for blocking said clocking;

(f) second clock means operating at a second cyclical rate connected to enable said gate means at the beginning of each cycle of said second cyclical rate;

(g) disabling means connected from said memory for disabling said gate after each unpicked number location in said memory has been addressed, the frequency of said first cyclical rate being greater than the frequency of said second cyclical rate by at least the number of said addressable storage locations whereby unpicked number locations are addressed consistently at said second cyclical rate irrespective of the sequential addressing of already picked number locations.

2. A random number selector according to claim 1 wherein said means to sequentially address is a first counter, a second counter is connected to sequentially and simultaneously address both said storage locations and a numerical display and a multiplexer is connected between said memory and both said first and said second counter, said multiplexer being operative to apply the address from said first counter to said memory for one half of each period of said first clock means and operative to apply the address from said second counter to said memory for the other half of each period of said first clock means.

3. A random number selector according to claim 2 including a last number picked display and a latch circuit wherein said first counter addresses said last number picked display simultaneously with addressing said memory and said latch circuit, said latch circuit being connected between said first counter and said last number picked display for latching only addresses of numbers just picked and holds them until a new number is picked.

4. A random number selector according to claim 1 further comprising a clock generator and a scaler which is connected to said generator for providing said first clock means and said second clock means.

5. A random number selector according to claim 1 wherein said memory is a digital random access memory.

6. A random number selector according to claim 1 wherein said gate means for blocking said clocking comprises an AND gate, a flip-flop having set and reset inputs, a connection from said second clock means to the SET input of said flip-flop, reset means connected to the reset input of said flip-flop and responsive to a simultaneous output from said AND gate and an unpicked address output from said memory to reset said flip-flop, a connection from an output of said flip-flop to an input of said AND gate to enable said AND gate when said flip-flop is set, and a connection from said first clock means to a second input of said AND gate whereby said AND gate passes pulses from said first clock means to said counter when said flip-flop is set, and said flip-flop is reset, blocking said pulses, when a pulse passing said AND gate coincides with the addressing of an unpicked location in said memory.

7. A random number selector according to claim 1 including a manual pick switch wherein the frequency in Hertz of said second clock means is greater than the number of said storage locations whereby it is impossible for a human being to operate said manual PICK switch so as to affect the likelihood of certain numbers being picked.

8. A method of sequencing selections through a fixed number of digital storage locations in which picked selections are deleted from further selection without loss of randomness comprising:

(a) addressing said digital storage locations by a counter;

(b) sequencing said counter at a first clock rate when the locations addressed have not been previously selected;

(c) sequencing said counter at a second clock rate faster than said first clock rate by enough to address every location of said digital storage locations during a single cycle at said first clock rate when the location addressed have been previously selected; and, (d) inhibiting selection when said counter addresses locations previously selected.

* * * * *